United States Patent [19]

Likens et al.

[11] Patent Number: 5,631,960

[45] Date of Patent: May 20, 1997

[54] AUTOTEST OF ENCRYPTION ALGORITHMS IN EMBEDDED SECURE ENCRYPTION DEVICES

[75] Inventors: Thomas H. Likens, Fort Worth; Thomas M. Norcross, Arlington, both of Tex.

[73] Assignee: National Semiconductor Corporation, Santa Clara, Calif.

[21] Appl. No.: 521,787

[22] Filed: Aug. 31, 1995

[51] Int. Cl.$^6$ .................................................. H04K 1/00
[52] U.S. Cl. ................................................................ 380/2
[58] Field of Search ...................................................... 380/2

[56] References Cited

U.S. PATENT DOCUMENTS 5,432,848  7/1995  Butter et al. ................................ 380/2

*Primary Examiner*—David C. Cain
*Attorney, Agent, or Firm*—Limbach & Limbach L.L.P.

[57] ABSTRACT

An internal state machine controller in an integrated circuit containing a cryptographic implementation independently tests and verifies each of the encryption and decryption algorithms and modes within the implementation with minimal processor intervention. The cryptographic implementation automatically generates all input data and exercises all feedback modes independent of the core processor. Eliminating external test vectors results in a device less expensive to manufacture and verify. Since the cryptographic implementation tests are performed independent of the processor, other parts of the integrated circuit may be tested simultaneously with the testing of the cryptographic implementation. The processor loads in a single set of predetermined test vectors and then signals the state machine to start the testing of all the algorithms contained in the module. The output of each algorithm is used as the input of the next algorithm. The encrypted output from each algorithm is then fed back into the algorithms in reverse order and decrypted. At the end of this cycle the data returned should match the original data exactly. This is considered a cycle. The number of cycles is programmable depending on the test requirements and or fault coverage desired. In the preferred embodiment, the cryptographic implementation includes a cryptographic engine having encryption and decryption modes. Output Feedback (OFB), Electronic Codebook (ECB), Cipher Block Chaining (CBC), and Cipher Feedback (CFB) modes are supported in the preferred embodiment of the present invention.

22 Claims, 8 Drawing Sheets

AUTOTEST OF ENCRYPTION ALGORITHMS IN EMBEDDED SECURE ENCRYPTION DEVICES

BACKGROUND OF THE INVENTION

1. Field of the Invention

The present invention relates to testing encryption and decryption algorithms and modes. Specifically, the preferred embodiment of the present invention relates to testing encryption hardware which previously required large amount of test time and test data to test encryption algorithms used in encryption devices. The present invention is especially applicable to low power, hardware cryptographic token applications.

2. Discussion of the Related Art

Referring to FIG. 1, the field the present invention involves a production tester 100 performing testing on a cryptographic system (product) 102. The cryptographic system 102 is either a single integrated circuit or a system including several integrated circuits. The product 102 under test includes at least a cryptographic function implementation 103. The cryptographic function implementation 103 is either hardware-based, software-based, or some combination of software with special hardware support. The production tester 100 includes a pattern generating portion that produces input test vectors 105 to input to the product 102. The production tester 100 also includes a logic analyzer section for receiving output test vectors 106 from the product 102. The production tester 100 will typically run a test program 101 which includes selected values for the input test vectors 105 and the expected correct output test vectors 106 for any specific product 102. The input test vectors 105 are typically chosen so as to fully exercise the product 102. If any part of the product 102 is flawed, the output test vectors 106 will not match the precomputed expected (correct) results stored in the test program 101, and the product 102 under test will fail production testing.

There are a very large number of possible input permutations and states in the cryptographic implementation. Because it is desirable to fully test the hardware cryptographic circuitry, T, which represents the number of test blocks is usually made to be very large. Assuming that the portion of circuitry tested during a particular cryptographic cycle i is a random P fraction of the total hardware, then the total test coverage F fraction of the total hardware is $1-(1-P)^T$. This means that in order to achieve a high fault coverage, the number of test message blocks T is increased. Unfortunately, however, the T test blocks TB(1) through TB(T) are stored in the test program 101 as cryptographic test data 104. If since P is a low number, T must be large to achieve high fault coverage, and all this test data 104 is stored in the test program 101. It is undesirable to maintain a large amount of test data 104 in the test program 101. Even if a program were written which would generate test data without requiring large data storage, it would be undesirable to occupy the input vector lines for a lengthy cryptographic test, since this would forestall further tests which must be performed on the other parts of the product 102. Thus the total test time increases since the cryptographic function test must occur serially with the other tests.

Block cryptographic algorithms operate on blocks of plaintext and ciphertext. Often 64 bits is the block size of both input blocks and output blocks. The simplest way to use a cryptographic algorithm is to encrypt each input block P to produce the output block C. Here EECB(P)=C. This is called electronic codebook (ECB) mode. Electronic codebook mode derives its name from the fact that each unique input plaintext block always encrypts to the same output ciphertext block. The term "codebook" implies that a lookup table of codes could be formulated. However, because the typical block size is 64 bits, such a table would require $2^{64}$ entries, which is far too large to precompute and store. Furthermore, a different codebook exists for each possible key value. Electronic codebook decryption is simply the inverse cryptographic process.

Electronic Codebook Encryption (ECB)

$$C_i = E(P_i)$$

Electronic Codebook Decryption (ECB)

$$P_i = D(C_i)$$

The concept of chaining uses a feedback mechanism, because the results of the encryption of previous blocks are fed back into the encryption of the current block. This means that the previous encryption result is used to modify the encryption of the current block. Therefore, every encrypted output block is dependent not only upon the current input block, but upon all previous input blocks.

In cipher block chaining mode (CBC) encryption, the input plaintext block is XORed with the previous output ciphertext block before it is encrypted. After each encryption, the resulting ciphertext output block is stored in a feedback register to be bitwise XORed with the next input block. The decryption process is similar. As each input ciphertext block is decrypted, it is also saved in a feedback register. After the next ciphertext block is decrypted, an XOR operation is performed on the result of the feedback register.

Cipher Block Chaining Mode (CBC) Encryption $$C_i = E(P_i \text{ XOR } C_{i-1})$$

Cipher Block Chaining Mode (CBC) Decryption $$P_i = D(C_i) \text{ XOR } C_{i-1}$$

In each of the above equations, an initial value vector (IV) is used to provide the feedback value C0 for the first iteration.

In Cipher Feedback Mode (CFB) encryption, each ciphertext output block is the bitwise exclusive or of the encryption of the previous ciphertext and the plaintext. The Cipher Feedback Mode decryption takes advantage of the commutate nature of the XOR function that if A XOR B=C, then A=B XOR C. Therefore, the encryption function is used again even though decryption is being performed.

Cipher Feedback Mode (CFB) Encryption $$C_i = E(C_{i-1}) \text{ XOR } P_i$$

Cipher Feedback Mode (CFB) Decryption $$P_i = E(C_{i-1}) \text{ XOR } C_i$$

In the Output Feedback Mode (OFB) encryption, the cryptographic engine's input for each block is the engine's output from the previous block. The cryptographic engine begins with an initial value (IV) as plaintext data input. By block i, the engine has recursively performed encryption starting from the initial value i times, denoted by $E^i(IV)$. This mode also takes advantage of the commutative property of the exclusive or operation, and thus the encryption function $E^i(IV)$ is the same during both encryption and decryption.

Output Feedback Mode (OFB) Encryption $$C_i = E^i(IV) \text{ XOR } P_i$$

Output Feedback Mode (OFB) Decryption $$P_i = E^i(IV) \text{ XOR } C_i$$

The table below illustrates the encryption state of the cryptographic engine and the logical configuration implemented. E represents an encryption state of the cryptographic accelerator, and D represents a decryption state of the cryptographic accelerator.

| Mode | Encryption $C_i$ = | Decryption $P_i$ = |
|------|---------------------|---------------------|
| ECB  | $E(P_i)$ | $D(C_i)$ |
| CBC  | $E(P_i \text{ XOR } C_{i-1})$ | $D(C_i) \text{ XOR } C_{i-1}$ |
| OFB  | $E(C_{i-1}) \text{ XOR } P_i$ | $E(C_{i-1}) \text{ XOR } C_i$ |
| OFB  | $E^i(IV) \text{ XOR } P_i$ | $E^i(IV) \text{ XOR } C_i$ |

In order to test all the above modes, the problem is the large amount of test time and test data 104 in the test program 101 required to test encryption algorithms used in encryption devices. Especially devices designed for low power, hardware token applications.

Previously, testing and verification were performed using costly external test vectors to obtain the desired test coverage. Additional tests were also required for each of the commonly used feedback modes. The use of external test vectors resulted in extraordinarily large test time required in which to validate the device. This added significantly to the overall expense of manufacturing the module. Another major problem with the previous solution was that the testing of the module stalled testing of other modules contained in the since each module was verified serially. Also prior solutions failed to address the serious problem of excessive time and RAM requirements for Power-On-Self-Test (POST) in the field.

SUMMARY OF THE INVENTION

Previously, testing and verification were performed using costly external test vectors to obtain the desired test coverage. Additional tests were also required for each of the commonly used feedback modes. These common modes include (but are not limited to) Cipher-Block chaining (CBC), Output-Feedback (OFB), Cipher-Feedback (CFB), and Electronic-Codebook (ECB) modes.

The use of external test vectors increased the test time required to validate the device and added significantly to the overall expense of manufacturing the module. Another major problem with the previous solution was that the testing of the module stalled testing of other modules contained in the since each module was verified serially. Also prior solutions failed to address the serious problem of excessive time and RAM requirements for Power-On-Self-Test (POST) in the field.

The present invention employs an internal state-machine that independently tests and verifies each of the encryption algorithms contained within the device with minimal CPU intervention. It automatically generates all input data and exercises all feedback modes independent of the core processor. The method of testing according to the present invention is superior to that of related methods because no costly external test vectors are required. Eliminating external test vectors results in a device less expensive to manufacture and verify. Also since the tests are performed independent of the processor, it is possible to test other devices and modules in parallel with the encryption module. This parallel effort reduces test time and overall manufacturing cost. In addition it allows for higher fault coverage, an essential requirement when determining "known-good-die" at wafer sort.

This design employs a state machine controller that steps through each encryption mode automatically, eliminating the need for externally ROM stored test vectors. The test algorithm takes advantage of the symmetric nature of modern encryption and decryption algorithms to simplify the engineer's task of final test verification. Initially, the CPU loads in a single set of predetermined test vectors and then signals the state machine controller to start the testing of all the algorithms contained in the module. The output of each algorithm is used as the input of the next algorithm. The encrypted output from each algorithm is then fed back into the algorithms in reverse order and decrypted. At the end of this cycle the data returned should match the original data exactly. This is considered a cycle. The number of cycles is programmable depending on the test requirements and or fault coverage desired.

This design reduces the test time and cost required to test and manufacture integrated encryption hardware tokens. It is valuable to the expanding nascent data security marketplace. This technique enables the manufacture of low power encryption embedded encryption hardware tokens at a significant reduction in cost.

These and other features and advantages of the present invention will be apparent from the Figures as fully described in the Detailed Description of the Invention.

BRIEF DESCRIPTION OF THE DRAWINGS

In all of the Figures, like numerals indicate like parts. Additionally, an element labeled XYZ can be found, possibly among other places, in Figure X. For example, element 204 is initially found in FIG. 2, but is illustrated using the same label 204 in later Figures.

The Figures illustrating the preferred method according to the present invention of testing the cryptographic implementation are more fully explained in the Detailed Description of the Invention.

DETAILED DESCRIPTION OF THE INVENTION

Figure 1:
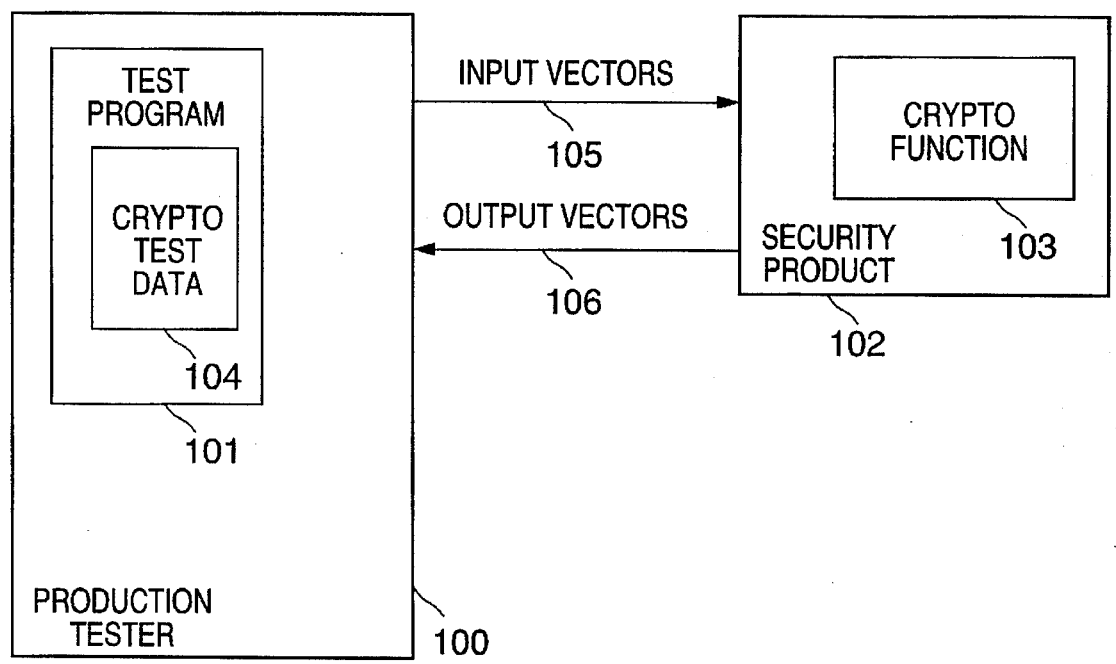
FIG. 1 illustrates a typical production testing environment for a product containing a cryptographic function.
Figure 2:
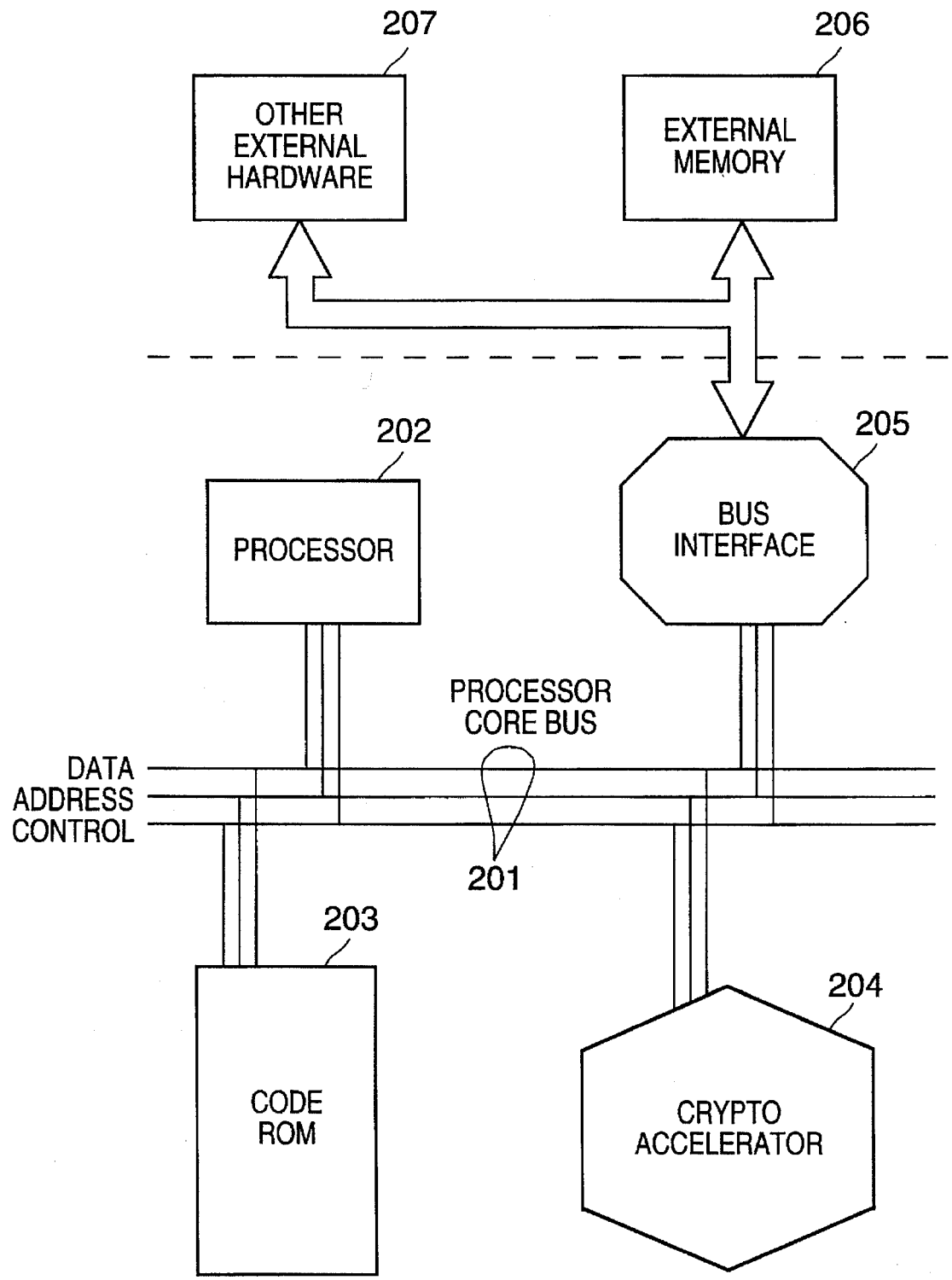
FIG. 2 is a block diagram of a product architecture suitable for use in the method according to the present invention of testing the cryptographic implementation.

FIG. 2 illustrates a suitable for testing according to the preferred embodiment of the present invention. The cryptographic product suitable for testing according to the present invention includes a RISC (Reduced Instruction Set Computing) processor 202, a code ROM 203, a hardware cryptographic accelerator module 204, and other necessary elements (such as a bus interface 205) in a single device, as depicted in FIG. 2. The cryptographic processor interfaces with external memory through a bus interface unit 205. The cryptographic processor contains a secure kernel that provides the essential elements of an API (Application Program Interface) which in turn provides access to internal chip resources. Application code for the cryptographic circuit card resides in an off-chip memory separate from the cryptographic processor chip. This off-chip application code gains access to the cryptographic processor through the bus interface unit 205. As shown in FIG. 2, the environment for the preferred embodiment of the present invention includes a 32-bit RISC processor 202 having a RAM (Random Access Memory) (not shown) for maintaining an internal stack for saved machine state resulting from exceptions (traps and interrupts), a hardware Cryptographic Accelerator implementation 204, and a non-volatile ROM memory (Read-Only Memory) 203 for storing the secure kernel. Other hardware functions can easily be included in, or eliminated from, the processor as desired. For example, the hardware Cryptographic Accelerator implementation can be eliminated by a software implementation, where the software implementation is stored within the ROM.

Software executing out of external memory gains access to the cryptographic services of the cryptographic processor via a Supervisor Call trap instruction (EXCP SVC). Prior to invoking this instruction, the external software will load specific processor registers with a command code and other parameters for the requested service and execute the EXCP SVC instruction. The exception service routine is stored within the ROM 203. The processor will then save the contents the current machine state on the interrupt stack in the SRAM, read a branch address from an interrupt dispatch table in the ROM 203. Then control is transferred to that branch address within the ROM 203.

The SVC exception service routine in the ROM 203 will verify the command code and parameters passed in the registers and branch to an appropriate command service routine within the ROM 203. When the command service routine has completed the requested operation, it will return to the SVC exception service routine which will restore the previous machine state from the internal stack in the SRAM, and return control to the external software. The product connects to external hardware 207 and external memory 206.

Figure 3:
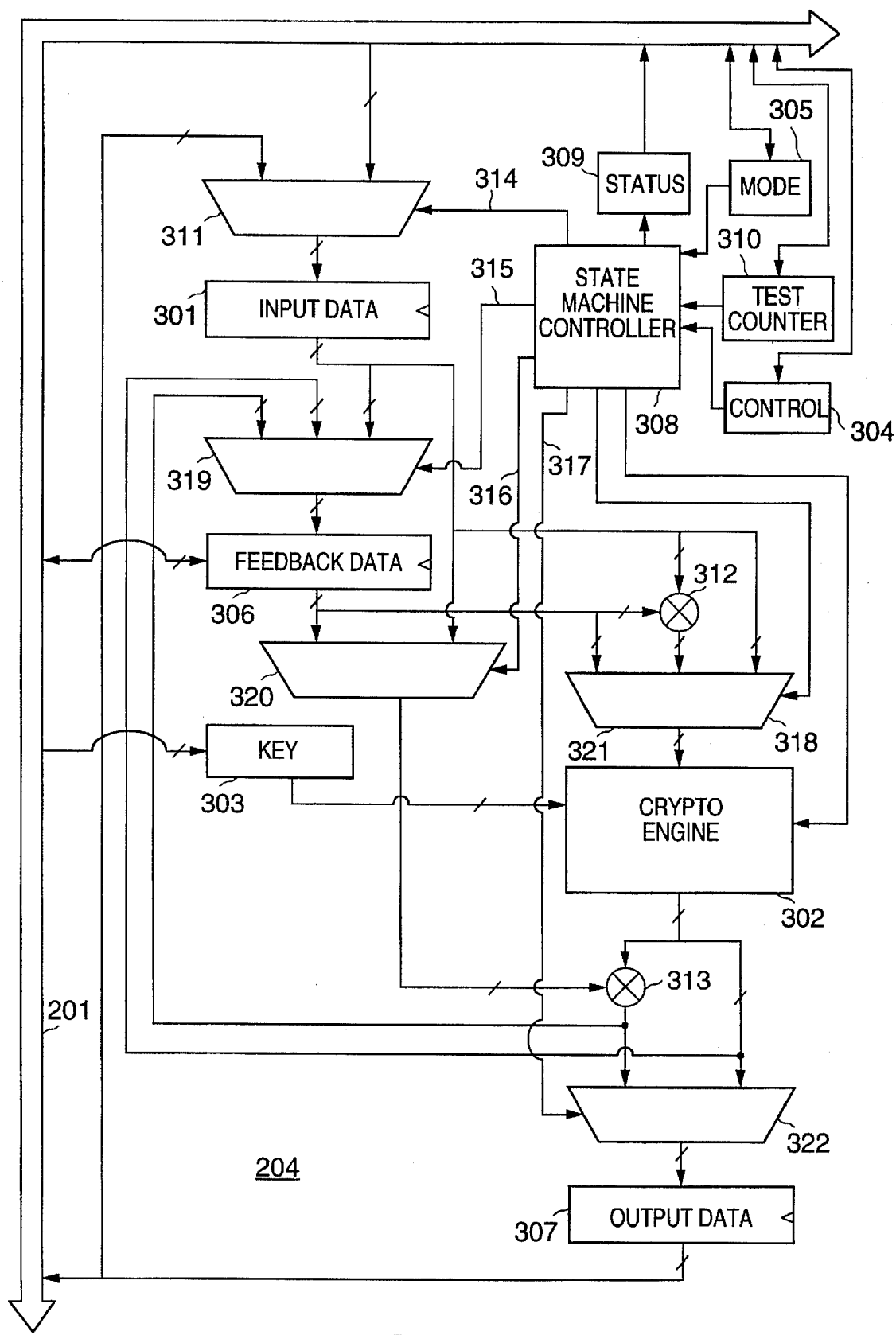
FIG. 3 is a schematic block diagram of a cryptographic implementation suitable for testing according to the method of the present invention.

FIG. 3 illustrates one way to implement the ECB, OFB, CBC, and CFB encryption and decryption modes using one cryptographic engine 302. The encryption algorithm implemented by the cryptographic engine 302 can be from among a variety of algorithms which take constant sized input blocks and produce constant sized output blocks. The Data Encryption Standard (DES) is suitable, for example. As illustrated in FIG. 3, the Cryptographic Accelerator Module 204 implements the Cryptographic algorithm's main functions. The Cryptographic module resides on the processor core bus 201. Data movement in and out of the block is not critical in meeting the performance requirements. The Cryptographic Module relies on a bus master (not shown), also residing on the core bus 201, to load all values required by the Cryptographic algorithm. These values includes data (plaintext or ciphertext) to be written into the input data register 301, a key to be written into key register 303, control bits to be written into control registers 304 (e.g., operating mode to be written into mode memory location 305), and an initial vector (IV) to be written into the feedback data register 306. When needed, an external source must pad the message to a block size appropriate to the mode. The Cryptographic module 204 performs all other functions of the cryptographic algorithm being used. The cryptographic module puts its encryption/decryption ciphertext/plaintext output for the selected mode into output data register 307. The Cryptographic module supports 8-, 16- and 32-bit wide reads and writes. The module resides on the processor core bus.

This functional overview for encryption/decryption with the Cryptographic Accelerator module assumes that the module is, initially, in the idle state. The module sets its stopped status bit when in the idle state. A bus master initializes the module by writing information such as the key, initial vector, data input, and mode. The bus master then issues a start command. The module operates autonomously and, once processing has started, a bus master is free to load the next data block to be operated on. The module has a single, 64-bit input data queue. The stopped status bit indicates process completion and that the result is in the output buffer. Processing for the next block may begin before reading the output buffer but the new data will not be transferred into the output buffer until it has been emptied.

The Cryptographic Algorithm module supports Electronic Codebook ECB, Cipher Block Chaining CBC, and Output Feedback OFB modes in hardware. The module also supports 64-bit Cipher Feedback CFB mode in hardware.

To achieve 20Mbits/sec processing with a 20MHz processing clock, the effective encrypt/decrypt rate must be 1 bit/clock. Therefore, a 64-bit block (OFB, CBC or ECB) encrypt/decrypt operation will not exceed 64 clocks. The module uses a 64-bit input buffer and a 64-bit output buffer to hide the processor interface overhead during encryption/decryption. This concurrency maintains overall throughput performance. The Cryptographic module processes data at 20 Mbits/sec. The module accomplishes this with concurrent assistance from the processor. The processor is responsible for message padding and data loading/unloading.

The security requirements for this module consist of making the CRYP_key register write only. A Memory Management Unit restricts access to this module.

The Cryptographic Algorithm Module is subdivided into four functional blocks:

Bus Interface Unit
State Machine/Controller
Register block
Cryptographic engine

The BIU (not shown) is the interface between the module's internal functional blocks and the processor core bus. The BIU decodes the address, inserts wait states, latches data off the core bus, and writes data onto the core bus. The BIU complies with the processor core bus specification. All data reads and writes are 8, 16, or 32 bits wide.

The State Machine/Controller 308 functional block maintains all necessary logic to operate the Cryptographic Algorithm Engine 302 except for the control logic located in the BIU. This includes information such as the current Cryptographic Algorithm Engine state, how to handle the various modes (CBC/ECB) and operations (encrypt/decrypt).

The Register block (not shown) contains the status 309, control 304 CRYP_con, key 303 CRYP_key, mode 305 CRYPT_mode, configuration (not shown), initial vector 306 CRYP_IV, data in 301 CRYP_din, and data out 307 CRYP$_{13}$ dout registers used for operating the Cryptographic Accelerator module. The CRYP_con, CRYP_mode, CRYP_atcnt, CRYP_IV, and CRYP_key registers should not be written to unless the Cryptographic engine is in stopped mode.

The Cryptographic engine 302 performs encryption and decryption. When in the encryption state, the cryptographic engine performs a function E ( P )=C. When in a decryption state, the cryptographic engine performs an function D ( C )=P, such that E is an inverse function of D.

| Register | Bits | Definition | Type | R/W | Rst |
|---|---|---|---|---|---|
| CRYP_con | 15–0 | control register | control | r/w | 0 |
| reserved | 15–3 | | | | |
| auto_test | 15–3 | initiate self test | | | |
| sanitize | 3 | clear all registers | | | |
| start | 2 1 0 | start/stop CRYPTO | | | |
| CRYP_mode | 15–0 | modes of operation | control | r/w | 0 |
| reserved | 15–4 | encrypt = 1, | | | |
| encrypt | 4 | decrypt = 0 | | | |
| mode | 3 2–0 | ECB, CBC, CFB, OFB | | | |
| CRYP_stat | 15–0 | Status Register | status | ro | 05 h |
| reserved | 15–4 | | | | |
| test_state | 15–4 | self test indicator | | | |
| stopped | 4 3 | CRYPTO is in stopped mode | | | |
| dob_ready | 2 1 | data output buffer ready | | | |
| dib_ready | 0 | data input buffer ready | | | |
| CRYP_atcnt | 7–0 | Auto_test counter | test | r/w | 0 |
| reserved | 7–4 | | | | |
| test_cnt | 3–0 | test counter | | | |

-continued

| Register | Bits | Definition | Type | R/W | Rst |
|---|---|---|---|---|---|
| CRYP_din | 63–0 | data in for encrypt (decrypt) | data | r/w | 0 |
| CRYP_dout | 63–0 | data out | data | ro | 0 |
| CRYP_IV | 63–0 | initialization vector | data | r/w | 0 |
| CRYP_key | 79–0 | key | data | w/o | N/A |

CRYP_con Register Description

| D15 | D2 | D1 | D0 | |
|---|---|---|---|---|
| Resv[15:3] | auto_test | sanitize | start | |
| N/A | 0 | 0 | 0 | reset condition | bits 15-3: Resv— Reserved, always read 0.
bit 2: auto_test— 0 = no action
1 = initiates self test
Note: This bit is self-clearing
bit 1: sanitize— 0 = no action
1 = clear all data registers
Note: This bit is selfclearing
bit 0: start— 0 = stop encryption or decryption
1 = start encryption or decryption CRYP_mode Register Description

| D15 | D3 | D2 | D1 | D0 | |
|---|---|---|---|---|---|
| Resv[15:4] | encrypt | mode 2 | mode 1 | mode 0 | |
| N/A | 0 | 0 | 0 | 0 | reset condition | bits 15-4: Resv— Reserved, always read 0.
bit 3: encrypt— 0 = decrypt
1 = encrypt
bits 2-0: mode2-0— 000 = Electronic Codebook (ECB)
001 = Cipher Block Chaining (CBC)
010 = Output Feedback (OFB)
011 = Cipher Feedback (CFB)
100 = reserved
101 = reserved
110 = reserved
111 = reserved CRYP_stat Register Description

| D15 | D3 | D2 | D1 | D0 | |
|---|---|---|---|---|---|
| Resv[15:4] | test_state | stopped | dob_rdy | dib_rdy | |
| N/A | 0 | 1 | 0 | 1 | reset condition | bits 15-4: Resv— Reserved, always read 0.
bit 3: test state— 0 = not in test mode
1 = Self test in progress
bit 2: stopped— 0 = CRYPTO is not in stopped mode
1 = CRYPTO is in stopped mode
bit 1: dob_rdy— 0 = data output buffer not ready to be read
1 = data output buffer ready to be read
bit 0: dib_rdy— 0 = data input buffer not ready to be loaded
1 = data input buffer ready to be loaded CRYP_atcnt Register Description

| D15 | D3 | D2 | D1 | D0 | |
|---|---|---|---|---|---|
| Resv[7:4] | test_cntr4 | test_cntr3 | test_cntr2 | test_cntr1 | |
| N/A | 0 | 0 | 0 | 0 | reset condition | bits 7-4: Resv- Reserved, always read 0,
bits 3-0: This 4-bit programmable counter programs the number of rounds for the self test.

CRYP_din Register Description

-continued

```
Data [63:0]
0    reset condition
``` bits 63-0: Data input to CRYPTO engine. Plaintext for
encryption or ciphertext for decryption.
CRYP_dout Register Description

```
Data [63:0]
0    reset condition
``` bits 63-0: Data output of CRYPTO engine. Ciphertext for
encryption or plaintext for decryption.
CRYP_IV Register Description

```
Data [63:0]
0    reset condition
```

Data 63:0  Input register for initialization vector.
CRYP_key Register Description

```
Data [79:0]
0    reset condition
``` bits 79-0: Input register for key.

| Register | A 5 | A 4 | A 3 | A 2 | Effective Address | Width (bits) |
|---|---|---|---|---|---|---|
| CRYP_con | 1 | 0 | 0 | 0 | 020 h | 16 |
| CRYP_stat | 1 | 0 | 1 | 0 | 028 h | 16 |
| CRYP_mode | 1 | 0 | 1 | 1 | 02 Ch | 16 |
| CRYP_dinL | 0 | 0 | 0 | 0 | 000 h | 32 |
| CRYP_dinH | 0 | 0 | 0 | 1 | 004 h | 32 |
| CRYP_doutL | 0 | 0 | 1 | 0 | 008 h | 32 |
| CRYP_doutH | 0 | 0 | 1 | 1 | 00 Ch | 32 |
| CRYP_atcnt | 0 | 1 | 1 | 1 | 01 Ch | 8 |
| CRYP_IVL | 1 | 1 | 0 | 0 | 030 h | 32 |
| CRYP_IVH | 1 | 1 | 0 | 1 | 034 h | 32 |
| CRYP_KeyL | 0 | 1 | 0 | 0 | 010 h | 32 |
| CRYP_KeyM | 0 | 1 | 0 | 1 | 014 h | 32 |
| CRYP_KeyH | 0 | 1 | 1 | 0 | 018 h | 16 |

In the CRYP_con and CRYP_stat registers, the start bit may be used to pipeline the CRYPTO engine. Initially, start=0.

The CRYP_din 301, CRYP_IV 306, and CRYP_key 303 may be loaded in any order prior to setting the start bit. Loading CRYP$_{13}$ din 301 clears the dib_ready flag.

When start is set, the CRYPTO engine 302 reads in the data from CRYP_din 301, clears the stopped flag and sets dib_ready. Immediately preloading CRYP_din establishes the CRYPTO engine 302 pipeline. Loading the high byte of CRYP_din 301 starts the CRYPTO engine 302 when the current block is complete.

When CRYPTO 302 completes a block, it loads the result into CRYP_dout 307 and sets dob_ready. CRYPTO 302 continues in this mode until start is cleared. After start is cleared, CRYPTO 302 finishes processing the current CRYP_din data block and sets the stopped flag. If the start bit is set, CRYPTO will immediately process CRYP_din 301 the next time the high byte of CRYP_din 301 is loaded.

Setting the sanitize bit clears all data registers, sets dib_ready, clears dob_ready, and sets stopped.

Example usage of the Cryptographic hardware accelerator:
1. Read the Status register to check the stopped status bit.
2. If stopped status bit is cleared, go back to #1. If the bit is set, continue.
3. Write IV 306, Data_in 301, Key 303, mode 305, and config (not shown) to the appropriate registers.
4. Set the start bit to begin the operation.
5. Once the status register dib_ready bit is set, load the next data$_{13}$ in.
6. When the status register dob_ready bit is set, read the data out.
7. Repeat steps 5 and 6 as many times as needed.
8. When complete, clear the control register 304 start bit causing the module to stop once the last operation is complete.
9. Read the data out of the module.
10. Set the sanitize bit to clear out all data registers.

Example usage of the auto-test mode of the Cryptographic module according to the present invention:
1. Same as steps (1) through (3) of the previous example.
2. Load the CRYP_atcnt register 310 with the desired number of test cycles.
3. Set the auto_test bit to initiate self test.
4. Poll the test state bit to determine completion of the self test.
5. Compare the value of the data in the CRYP_dout register 307 with the data used to write the input data buffer 301. If they match, the test was successful. THE DATA IN THE CRYP_din REGISTER 301 CAN NOT BE USED SINCE IT IS ALTERED DURING SELF-TEST.
6. Set the sanitize bit to clear all registers.

If the reset signal is asserted, the module 204 returns to its idle state and sets the stopped status bit. All data registers are cleared, dib_ready is set, and dob_ready is cleared. The Cryptographic Algorithm Module 204 will enter the idle state after reset is deasserted.

If the following plain-text message is to be encrypted . . .

"Now is the time for all . . . "

it will be placed in a shared memory buffer by the bus interface 205 in the order presented below:

When the data is transferred into the Cryptographic input data buffer it is mapped in the manner illustrated below:

| Shared Memory Buffer Host | | | Keystone Card | | | | |
|---|---|---|---|---|---|---|---|
| address =00 | A0 | N | Proc reg. r0 = | space | w | o | N |
| | A1 | o | | | | | |
| | A2 | w | | | LOW 32-bits | | |
| Word 0 | A3 | space | Proc reg. r1 = | 1 | space | s | i |
| Address = 04 | A4 | i | | | HIGH 32-bits | | |
| | A5 | s | After the processor transfers data out of shared memory into the r0 and r1 registers it will be ordered as shown above | | | | |
| | A6 | space | This is caused by the processor reading the data out of shared memory in little-endian fashion (i.e. MSByte = MSAddress, etc.) | | | | |
| Word 1 | A7 | t | | | | | |

When the data is transferred into the Cryptographic input data buffer it is mapped in the manner illustrated below:

| HIGH 32-bits | | | | LOW 32-bits | | | |
|---|---|---|---|---|---|---|---|
| 1 | space | s | i | space | w | o | N | bits 63-0

To the processor, the 64-bit data-in registers simply appear as two memory locations where DINL is the lower of the two addresses. Internally the bytes are mapped so that the Cryptographic algorithm perceives the register as . . .

| N | o | w | space | i | s | space | t |
|---|---|---|---|---|---|---|---| bits 63-0

This is accomplished by swapping the bytes when the register is initially written and again whenever it is read by the system processor. The 64-bit initialization register and data-out register are handled in an analogous fashion. The 80-bit key register is slightly different. If we have the following hexadecimal key to encrypt (note, for purposes of simplicity each digit represents a byte in the key) . . .

| Shared Memory Buffer Host | | | Keystone Card | | | | |
|---|---|---|---|---|---|---|---|
| address =00 | A0 | 0 | Proc reg. r0= | 3 | 2 | 1 | 04 |
| | A1 | 1 | | | LOW 32-bits | | |
| | A2 | 2 | | | | | |
| Word 0 | A3 | 3 | Proc reg. r1= | 7 | 6 | 5 | 4 |
| Address =04 | A4 | 4 | | | MID 32-bits | | |
| | A5 | 5 | | | | | |
| | A6 | 6 | Proc reg. r2= | x | x | 9 | 8 |
| Word 1 | A7 | 7 | | | HIGH 32-bits | | |
| address =08 | A8 | 8 | | | | | |
| | A9 | 9 | | | | | |
| | A10 | x | | | | | |
| Word 2 | A11 | x | | | | | |

NOTE: It is recommended that the programmer read the key using two double word accesses followed by a word access to the shared memory buffer (although this is strictly not necessary since the Cryptographic module uses the lower 16 bits of the gd_t_in core bus to load the upper 16 bits of the key register.)

To the Proc (for purposes of writing the key), the register is mapped as . . .

| HIGH 16 bits | | MID 32 bits | | | | LOW 32 bits | | | |
|---|---|---|---|---|---|---|---|---|---|
| 9 | 8 | 7 | 6 | 5 | 4 | 3 | 2 | 1 | 0 | bits 79-0

To the Cryptographic algorithm the key appears in the register as follows.

| 0 | 1 | 2 | 3 | 4 | 5 | 6 | 7 | 8 | 9 |
|---|---|---|---|---|---|---|---|---|---| bits 79-0

Again this is accomplished by swapping the bytes when they are written to the register. No byteswapping occurs on the output of the key register because •rt is a write-only register.

According to the preferred embodiment of the present invention, the cryptographic module 204 may also be placed in a built-in self test mode. This mode will repeat four encryptions followed by four decryptions a specified number of times. The first of the four encryptions is executed in Output Feedback OFB mode. The second uses Electronic Codebook ECB mode, the third Cipher Block Chaining CBC mode, and the fourth uses 64-bit Cipher Feedback CFB. Inversely, the first of the four decryptions is executed in the 64-bit CFB mode. The second uses CBC mode, the third ECB mode, and the fourth uses OFB. This pattern of four encryptions and four decryptions is repeated the number of times specified in the Cryptographic automated test count register (CRYP_atcnt 310). The initial vector 306 is not updated during the cycle, but is updated after the last decryption. Therefore the ensuing cycle yields different intermediate results, while the final decryption always returns the original value. In the preferred embodiment with a four bit counter CRYPT_atcnt 310, the encryption/decryption cycles can be repeated a maximum of fifteen times.

The data input buffer (CRYP_din 301), the initialization vector register (CRYP_iv 306), the key register (CRYP_key 303) and the test mode counter register (CRYP_atcnt 310) must be loaded before starting the automated testing. After these registers are loaded, the auto test bit in the Cryptographic configuration register (CRYP_con) is set to begin the automated testing. Once testing begins, the test state bit in the Cryptographic status register (CRYP_stat 309) will be asserted. This bit should be polled to determine completion of the automated testing. The auto_test bit is self clearing and should not be used to determine the state of the automated test mode. The data in the data output register (CRYP_dout) will be identical to the input data T entered by the test program if the tests are completed successfully.

Figure 4:
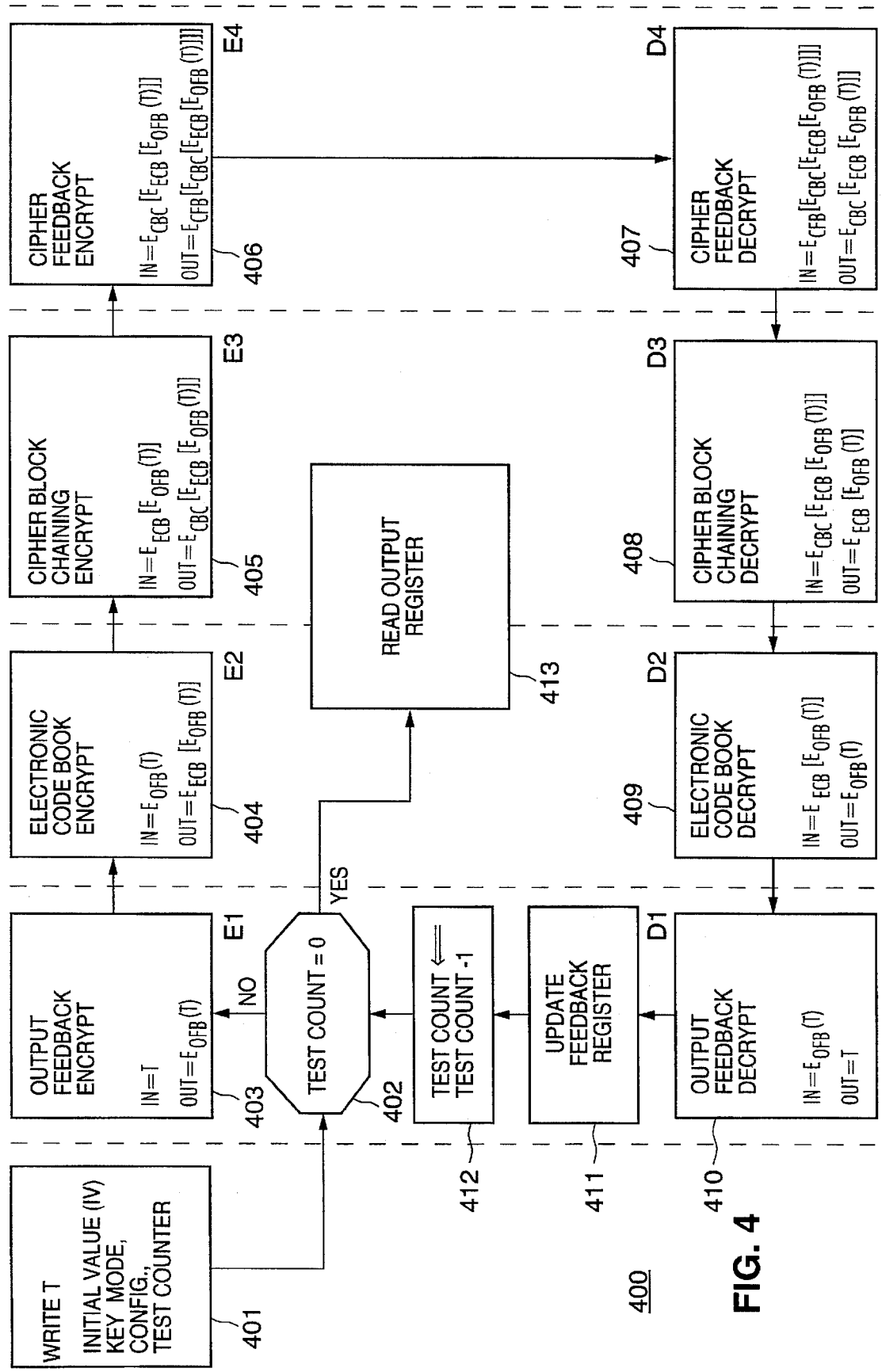
FIG. 4 is a flow chart diagram of the preferred embodiment of the method according to the present invention of testing a cryptographic implementation.
Figure 5A:
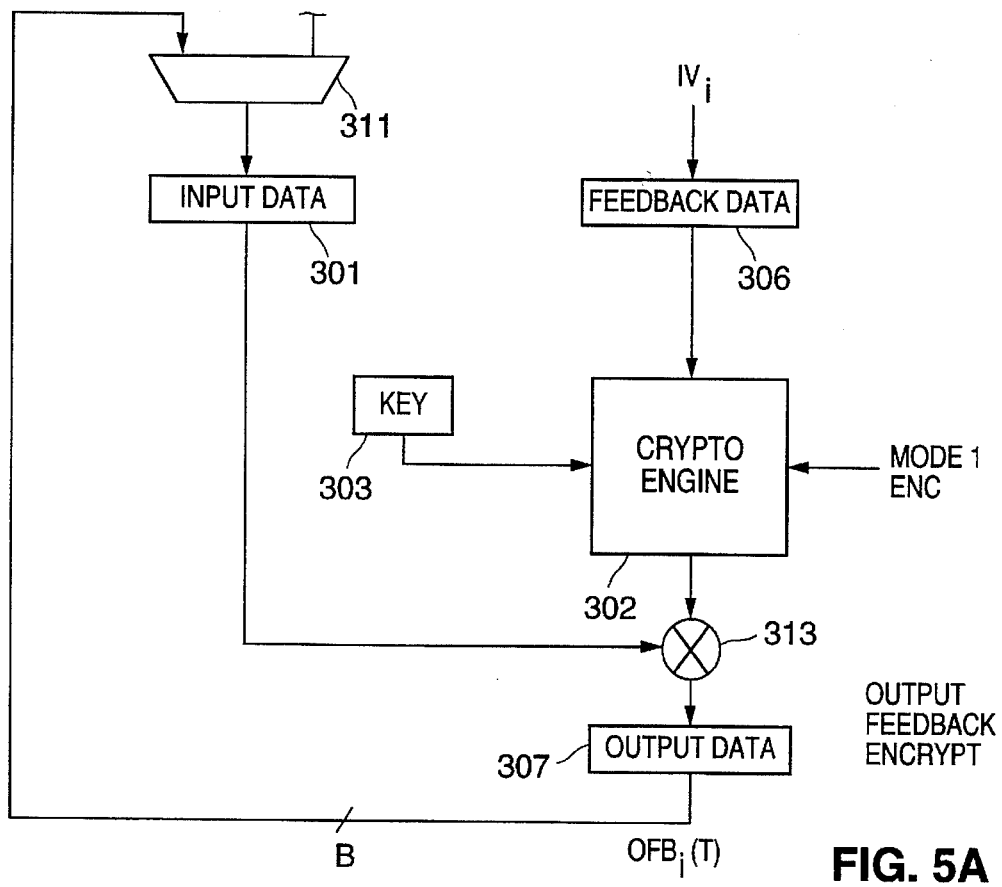
FIG. 5A is a sub-circuit which is the functional equivalent of a configuration of the circuit in FIG. 3 implemented by the state machine controller during step 403 in FIG. 4 according to the preferred embodiment of the method of testing according to the present invention.
Figure 5B:
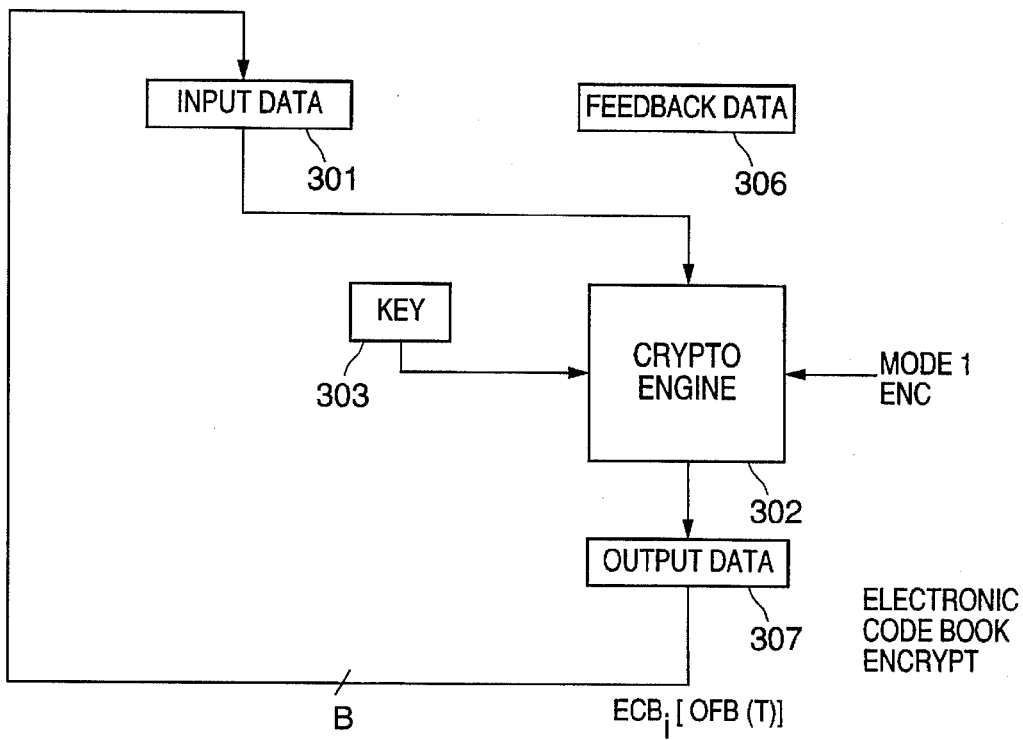
FIG. 5B is a sub-circuit which is the functional equivalent of a configuration of the circuit in FIG. 3 implemented by the state machine controller during step 404 in FIG. 4 according to the preferred embodiment of the method of testing according to the present invention.
Figure 5C:
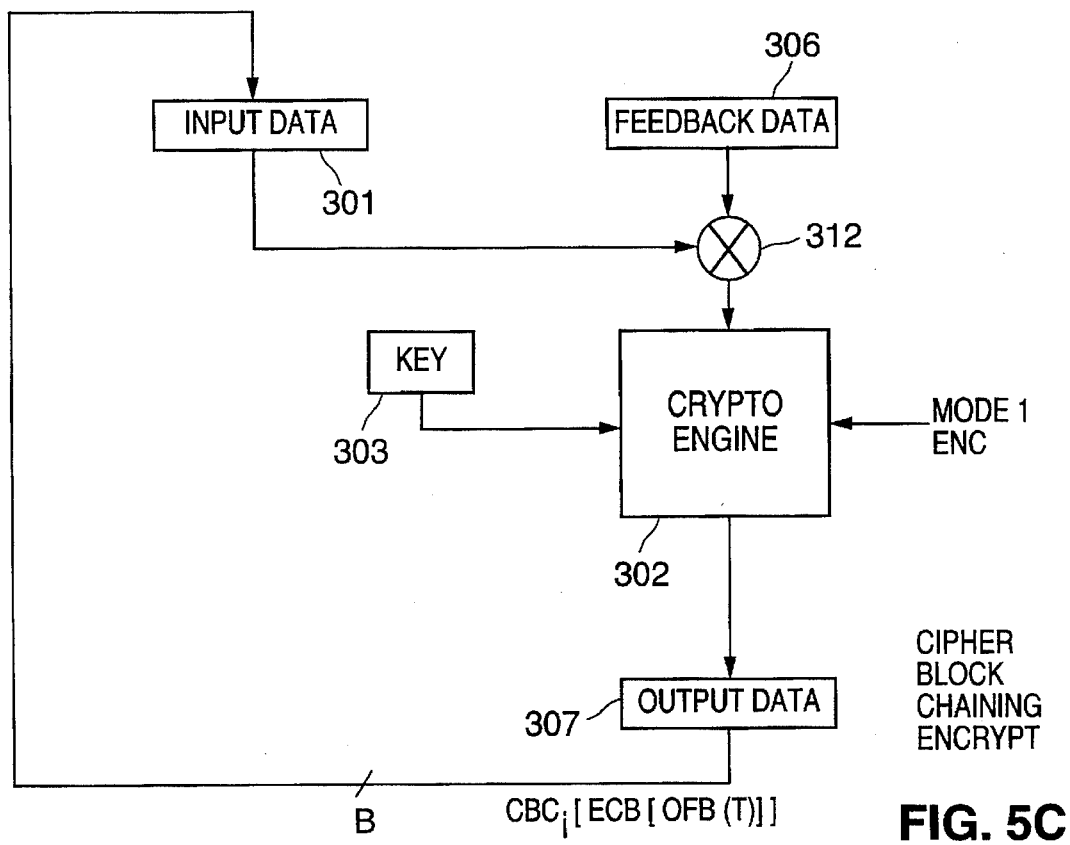
FIG. 5C is a sub-circuit which is the functional equivalent of a configuration of the circuit in FIG. 3 implemented by the state machine controller during step 405 in FIG. 4 according to the preferred embodiment of the method of testing according to the present invention.
Figure 5D:
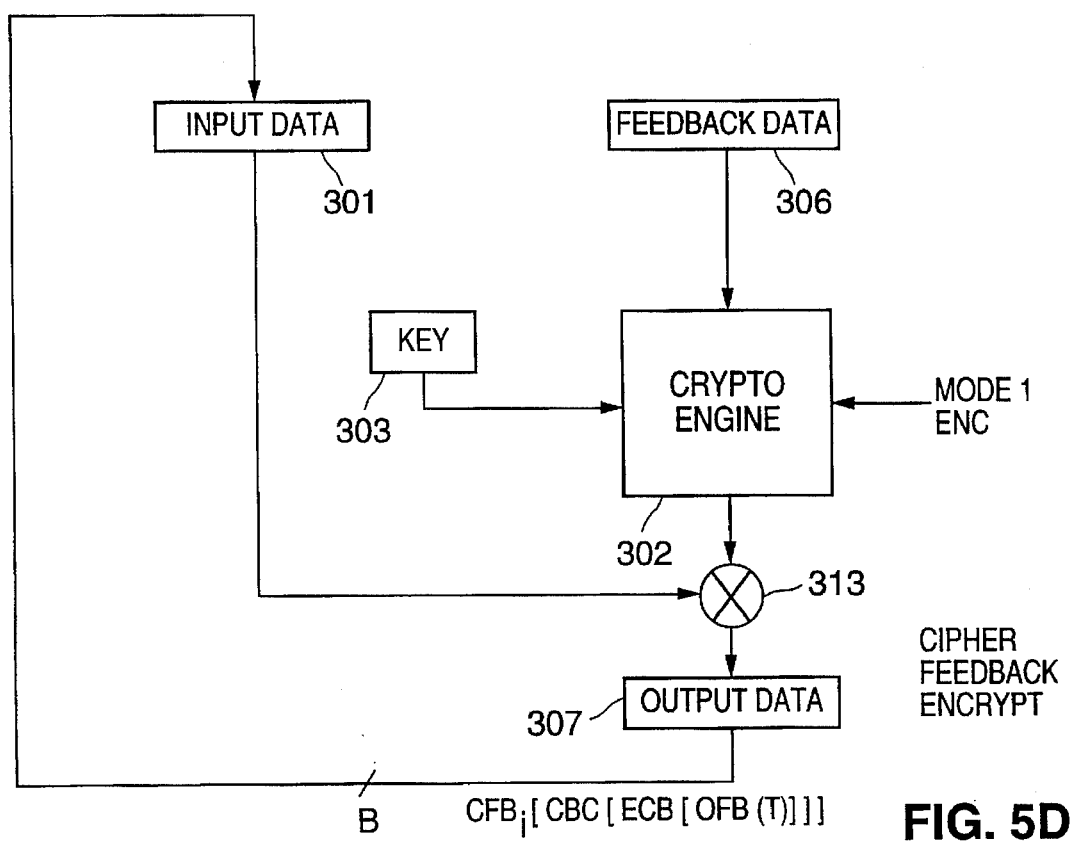
FIG. 5D is a sub-circuit which is the functional equivalent of a configuration of the circuit in FIG. 3 implemented by the state machine controller during step 406 in FIG. 4 according to the preferred embodiment of the method of testing according to the present invention.
Figure 5E:
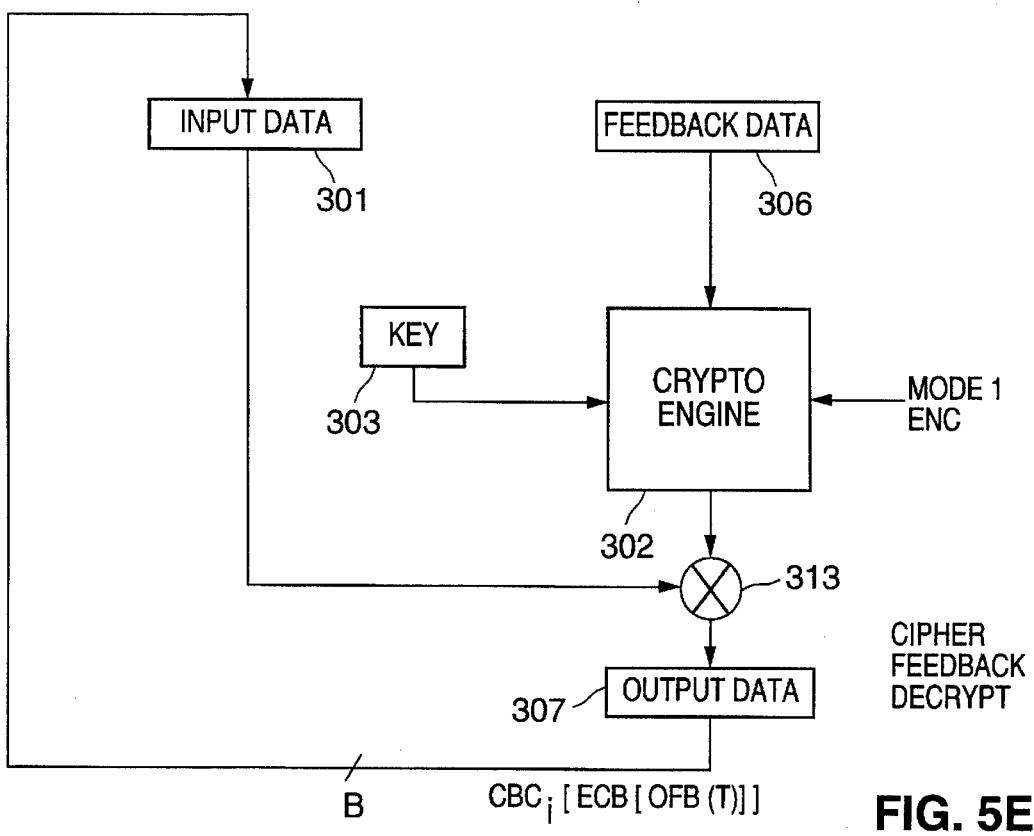
FIG. 5E is a sub-circuit which is the functional equivalent of a configuration of the circuit in FIG. 3 implemented by the state machine controller during step 407 in FIG. 4 according to the preferred embodiment of the method of testing according to the present invention.
Figure 5F:
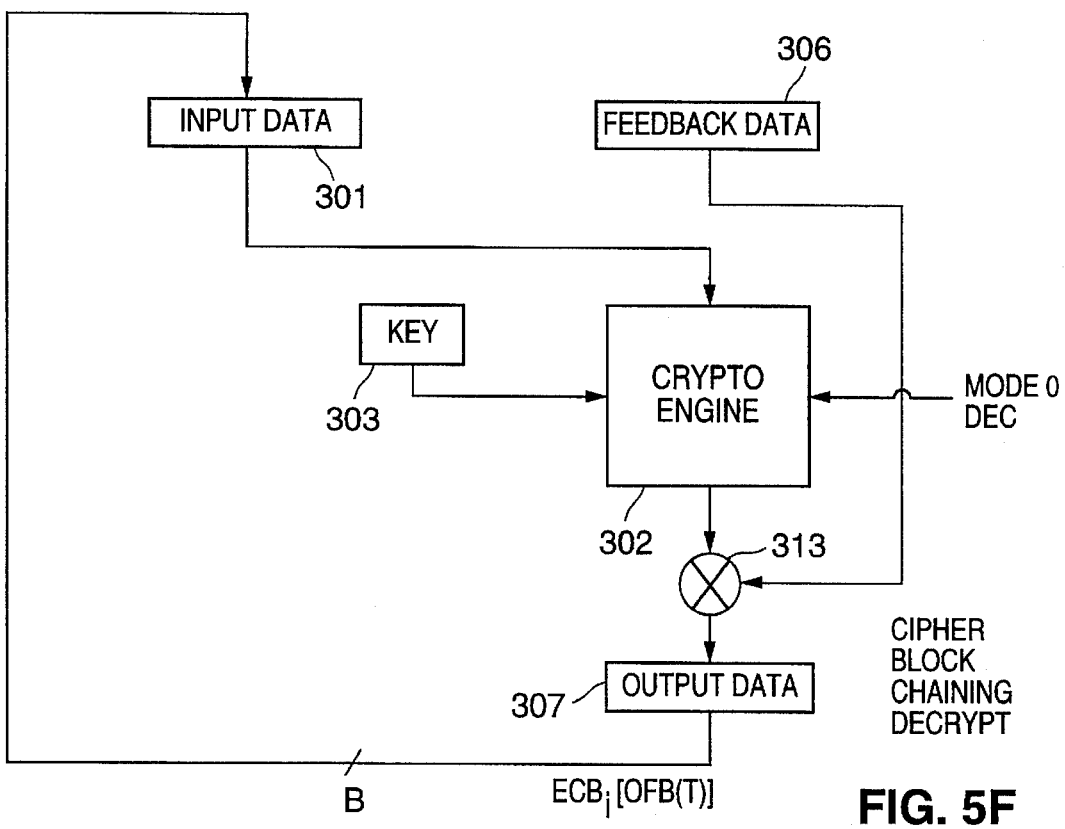
FIG. 5F is a sub-circuit which is the functional equivalent of a configuration of the circuit in FIG. 3 implemented by the state machine controller during step 408 in FIG. 4 according to the preferred embodiment of the method of testing according to the present invention.
Figure 5G:
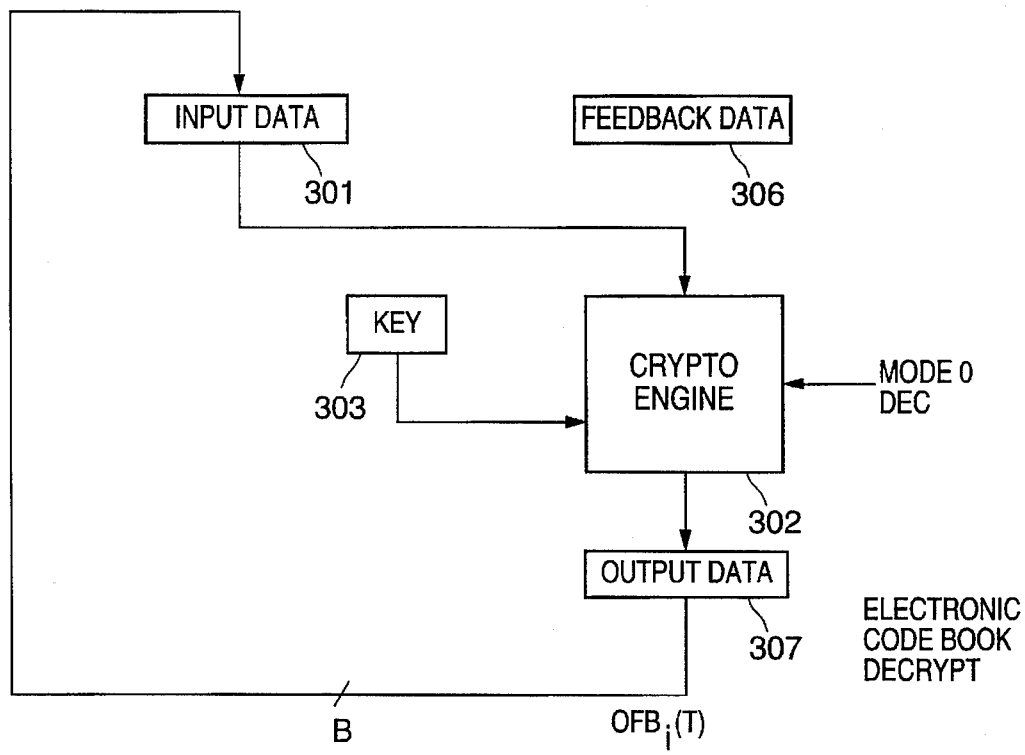
FIG. 5G is a sub-circuit which is the functional equivalent of a configuration of the circuit in FIG. 3 implemented by the state machine controller during step 409 in FIG. 4 according to the preferred embodiment of the method of testing according to the present invention.

FIG. 4 illustrates the method for automatically testing the Cryptographic Accelerator according to the present invention in conjunction with FIGS. 5A through 5H. At step 401, the initial values (IV) 306, key 303, mode 305, and test counter 310 are written by a bus master (such as 202), At step 402, the test counter 402 is compared to zero. If the test counter 402 has not reached zero, a branch to step 403 occurs and an output feedback OFB encryption, as illustrated in FIG. 5A, is performed. Multiplexor 311 selects T during step 401. At step 403, multiplexor 311 selects the output data 307. CRYP_mode is an encoded representation of one of the specific of the hardware configurations illustrated in FIGS. 5A–H. Before step 403, the State Machine 308 sets CRYP mode 30 to 1010. This causes state machine 308 to output multiplexor select signals 314 through 318 to configure a circuit such as shown in FIG. 3 into the functional equivalent of the circuit of FIG. 5A. Step 403 results in the output of the output feedback encryption being written into the input data register 301. Step 404, illustrated in FIG. 5B, performs an Electronic Codebook Encryption and rewrites the result over the input data 301. CRYP_mode contains 1000. The state machine controller 308 configures control signals 314–319 so as to implement the circuit shown in FIG. 5B during step 404. At Step 405, illustrated in FIG. 5C, a Cipher-Block Chaining encryption of the previous result is performed as CRYP_mode contains 1001, and the state machine controller 308 configures control signals 314–319 so as to implement the circuit shown in FIG. 5C during step 405. At step 406, illustrated in FIG. 5D, a Cipher Feedback encryption is performed as CRYP_mode contains 1011, and the state machine controller 308 configures control signals 314–319 so as to implement the circuit shown in FIG. 5D during step 406. At this point, the contents of the input data register 301 is CFBi[CBC[ECB[OFB(T)]]], the result of four nested encryptions.

Figure 5H:
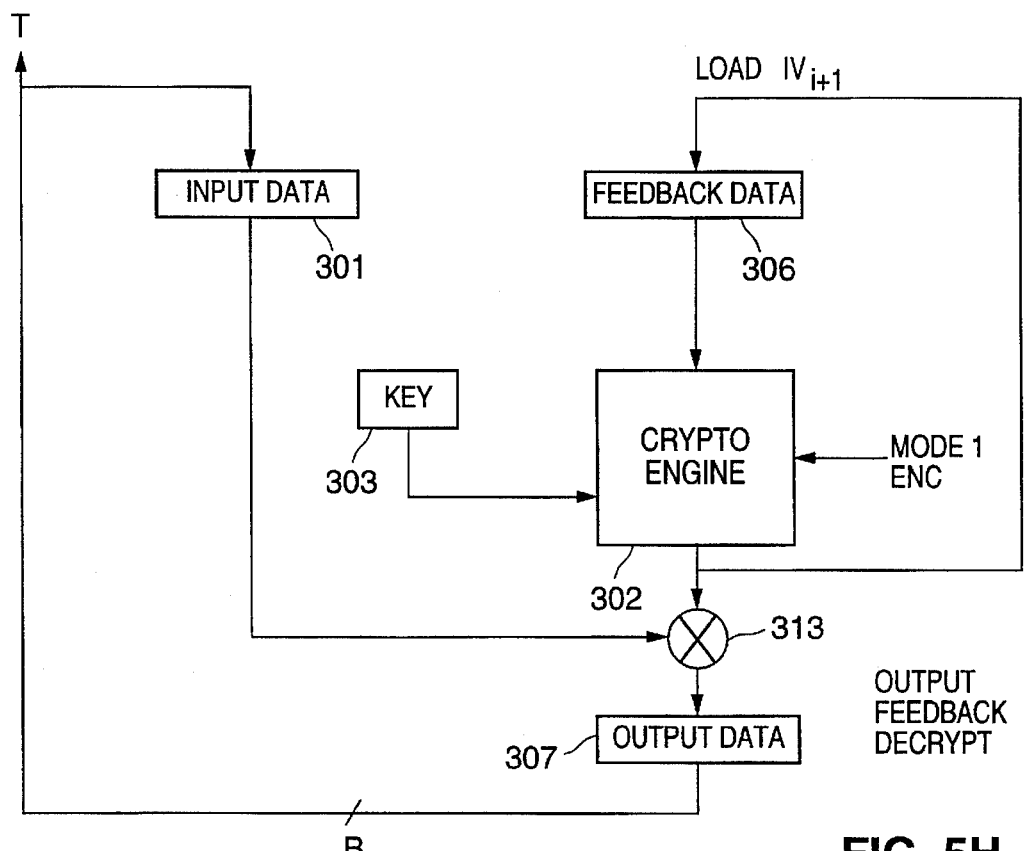
FIG. 5H is a sub-circuit which is the functional equivalent of a configuration of the circuit in FIG. 3 implemented by the state machine controller during step 410 in FIG. 4 according to the preferred embodiment of the method of testing according to the present invention.

Steps 407 through 410 reverse the encryption of steps 403 through 406. Therefore, at step 407, illustrated in FIG. 5E, a Cipher Feedback Decrypt is performed by as CRYP_mode is 1011. At step 408, illustrated in FIG. 5F, a Cipher Block chaining Decryption is performed as CRYP_mode is 0001. At step 409, illustrated in FIG. 5G, an Electronic Codebook Decryption is performed as CRYP_mode is 0000. At step 410, illustrated in FIG. 5H, an Output Feedback Decryption is performed as CRYP_mode is 1010. The result of this final decryption should be equal to the test block T. As illustrated in FIG. 5H, during the final Output Feedback Decryption, the initial value is updated in the Feedback Register 306. Thus, during step 411, the Feedback register 306 is updated so that $IV_{i+1}=E(IV_i)$. At step 412, the test counter 310 is decremented. At step 402, the test counter is tested for equality with zero. If the test counter has not reached zero, the hardware continues another cycle through steps 403 through 410 with an updated initial vector. This insures that every intermediate result will be different, and therefore will exercise a different fraction of the total implementation. If test 402 determines that the test counter has reached zero, the output register 307 is read by the test program. The software executing the self-test then compares the output result to the initial data T. If they are equal, the Cryptographic Accelerator 204 passes auto-test according to the present invention. If they are unequal, the Cryptographic Accelerator 204 fails auto-test according to the present invention.

If a production test is performed by feeding a predetermined set of inputs words to be encrypted or decrypted in one of the various modes, then the processor core bus 201 is occupied and testing of other modules must wait unit the cryptographic function test has finished. The fact that the cryptographic hardware feeds back its output 307 to its input 301 eliminates the need for the next test block to be loaded through the processor core bus 201. In this manner, the a high fault test coverage can be made large by running T different initial vectors (IV) 306 to achieve IV(1) to IV(T) to achieve $1-(1-P)^T$ fault coverage, if each cycle tests a random P fraction of the total encryption engine inputs and state permutations. Furthermore, all mode multiplexors 311, 319, 320, 321, and 322 can be verified. However, only one message block TB(1) and IV(1) are required as input. The remaining test message blocks TB are the same for each cycle, but the initial vector IV(i) is updated according to the mode tested in the last decryption of the cycle (step 410), which in the preferred embodiment is the Output Feedback mode (OFB) in which during test cycle i:

$IV_{i+1}=E(IV_i)$ to TB(T).

Because the writing of the test input data occurs through multiplexor 311 rather than through the processor core bus 201, other tests can be performed in parallel with the Auto Test according to the present invention. The ROM 203 can include a Power On Self Test (POST) program that runs after power on or reset which invokes a self test according to the present invention. The latency of the test can be masked by other tests occurring simultaneously.

While the present invention has been disclosed with particular reference to its preferred embodiment, that embodiment is presented by way of example, not by way of limitation. Those of ordinary skill in the art would be enabled by this disclosure to add to or modify the embodiment of the present invention in various ways as needed and still be within the scope and spirit of the present invention as recited in the appended claims.

For example, the order of the encryptions and decryptions according to the preferred embodiment of the present invention can be altered without departing from the spirit and scope of the present invention. In order to achieve the highest fault coverage; however, it is desirable not to perform an Electronic Codebook (ECB) mode encryption or decryption as the first step of the cycle. The Electronic Codebook mode does not use the initial vector. Therefore, if the Electronic Codebook mode were used, the same input and state permutations would be redundantly tested. By requiring that the first encryption/decryption (step 403) of the cycle be performed in a mode which requires an initial value input, redundant test coverage of the Electronic Codebook mode is avoided. A suitable alternative order would be, for example, CFB decrypt, ECB encrypt, CBC encrypt, OFB decrypt, OFB encrypt, CBC decrypt, ECB decrypt, and CFB encrypt. The above sequence illustrates that the first four steps are not necessarily all encryptions, either. As illustrated above, steps 403 through 406 can consist of four decryptions while steps 407 through 410 perform four encryptions in the corresponding modes as steps 406 through 403 had performed. The cryptographic engine according to the present invention has a state that takes on a value of either an encryption state E or a decryption state D. If modes 1 through 6 are supported by the accelerator, then a possible test cycle sequence could be chosen according to the present invention. (El represents encryption in mode 1; D3 represents decryption in mode 3.)

D6, E4, E3, E5, D1, D2 ... E2, E1, D5, D3, D4, E6.

According to the present invention, if the first half of operations to the left of the dots is viewed as a forward test operation, the second half of operations to the right of the dot is a reverse test operation, in which the mode numbers are the same as in a corresponding operation the same distance away from the dots on the other side, while the state (E or D) is the opposite of the state in the corresponding operation so that the operation reverses the effects of the corresponding operation in the forward test operation.

Furthermore, other modes and encryption algorithms are suitable for testing according to the methods of the present invention. For example, suitable encryption algorithms are: the Data Encryption Standard (DES) and Skipjack.

Additional block algorithms suitable for testing according to the present invention include:

Lucifer—(J. L. Smith, "Recirculating Block Cipher Cryptographic System," U.S. Pat. No. 3,796,830, 12 Mar., 1974).

Madryga—(W. E. Madryga, "A High Preformance Encryption Algorithm," Computer Security: A Global Challenge, North Holland: Elsevier Science Publishers, 1984, pp. 557–570).

NewDES—(C. Connell, "An Analysis of NewDES: A Modified Version of DES," Cryptologia, v. 14, n. 3Jul. 1990, pp. 217–223).

FEAL-N—(A. Shimizu and S. Miyaguchi, "Data Randomization Equipment," U.S. Pat. No. 4,850,019, Jul. 18, 1989).

REDOC II or REDOC III—(M. C. Wood, "Method of Cryptographically Transforming Electronic Digital Data from One Form to Another," U.S. Pat. No. 5,003,596, 26 Mar., 1991).

LOKI—(L. Brown, M. Kwan, J. Pieprzyk, and J. Seberry, "LOKI: A Cryptographic Primitive for Authentication and Secrecy Applications," Advances in Cryptology—AUSCRYPT '90 Proceedings, Berlin: Springer-Verlag, 1990, pp. 229–236).

Khufu and Khafre—(R. C. Merkle, "Method and Apparatus for Data Encryption," U.S. Pat. No. 5,003,597, Mar. 26, 1991).

IDEA—(J. L. Massey and X. Lai, "Device for Converting a Digital Block and the Use Thereof," International Patent PCT/CH91/00117, Nov. 28, 1991).

MMB—(J. Deamen, R. Govaerts, and J. Vandewalle, "Block Ciphers Based on Modular Arithmetic," Proceedings of the 3rd Symposium on State Progress of Research in Crytography, Rome Italy, Feb. 15–16, 1993, pp. 80–89).

CA-1.1—(H. Gutowitz, "Method and Apparatus for Encryption, Decryption, and Authentication Using Dynamical Systems," U.S. patent pending, 1992).

In addition, the modes chosen for the preferred embodiment are chosen only by way of example. Other modes can be supported as well, such as Plaintext block chaining (PBC), which is similar to CBC except that the previous plaintext block is XORed with the plaintext block instead of with the ciphertext block. Plaintext feedback (PFB) is similar to CFB, except that plaintext feedback drives the encryption engine rather than cipher feedback. Other modes in include Cipher block chaining of plaintext difference (CBCPD) and output feedback with a non-linear function (OFBNLF). (See, C. Jansen and D. E. Boekee, "Modes of Blockcipher Algorithms and Their Protection Against Active Eavesdropping," Advances in Cryptology—EUROCRYPT '87 Proceedings, Berlin: Springer-Verlag, 1988, pp. 281–286, for a thorough discussion of other modes.)

Accordingly, various changes and modifications which are obvious to a person skilled in the art to which the invention pertains are deemed to lie within the spirit and scope of the invention as claimed.

What is claimed is:

1. A method of testing a cryptographic accelerator that implements a cryptographic function having a state that is either an encryption state or a decryption state, such that the encryption state is an inverse decryption state, and such that the decryption state is an inverse encryption state, implementing the cryptographic function in each of n modes, comprising the steps of:

for integer i equal 1,
  performing a first cryptographic operation in a first state in a first mode taking a B-bit cryptographic test block as input and producing a B-bit first intermediate encrypted result;

for i from 2 to n,
  performing an $i^{th}$ cryptographic operation in an $i^{th}$ state in an $i^{th}$ mode taking the B-bit $(i-1)^{th}$ intermediate result as input and producing a B-bit $i^{th}$ intermediate encrypted result;

for i from n+1 to 2n−1,
  performing an $i^{th}$ cryptographic operation in the inverse $(2n-i+1)^{th}$ state in the $(2n-i+1)^{th}$ mode taking the B-bit $(i-1)^{th}$ intermediate result as input and producing a B-bit $i^{th}$ intermediate encrypted result; and for i equal 2n,
  performing a $2n^{th}$ cryptographic operation in the inverse first state in the first mode taking the B-bit $(i-1)^{th}$ intermediate result as input and producing a B-bit accelerator computed test result.

2. A method as in claim 1, further comprising the steps of:
comparing the B-bit accelerator computed test result to the B-bit cryptographic test block;
returning a pass result if the comparing step detects equality; and
returning a fail result if the comparing step does not detect equality.

3. A method as in claim 1, wherein B is 64.

4. A method as in claim 2, wherein n is 4.

5. A method as in claim 4,
wherein the first through fourth states are encryption.

6. A method as in claim 4,
wherein the first mode is Output Feedback Mode;
wherein the second mode is Electronic Codebook Mode;
wherein the third mode is Cipher Block Chaining Mode; and
wherein the fourth mode is Output Feedback Mode.

7. A method as in claim 1,
wherein each cryptographic operation is performed using a cryptographic engine having a key input, a B-bit data input, and an encrypt/decrypt state input, and producing a B-bit data output.

8. A method as in claim 1, further comprising the steps of:
comparing the B-bit $n^{th}$ intermediate encrypted result to a predetermined known correct answer;
returning a pass result if the comparing step detects equality; and
returning a fail result if the comparing step does not detect equality.

9. A method of testing a cryptographic accelerator that implements a cryptographic function having a state that is either an encryption state or a decryption state, such that the encryption state is an inverse decryption state, and such that the decryption state is an inverse encryption state, implementing the cryptographic function in each of n modes, comprising the steps of:

for integer t equal 1,
    for integer i equal 1,
        performing a first first cryptographic operation in a first first state in a first first mode taking a B-bit cryptographic test block and a first B-bit initial value as inputs and producing a first B-bit first intermediate encrypted result;
    for i from 2 to n,
        performing a first $i^{th}$ cryptographic operation in a first $i^{th}$ state in a first $i^{th}$ mode taking the first B-bit $(i-1)^{th}$ intermediate result and a first B-bit initial value as inputs and producing a first B-bit $i^{th}$ intermediate encrypted result;
    for i from n+1 to 2n−1,
        performing a first $i^{th}$ cryptographic operation in the inverse first $(2n-i+1)^{th}$ state in the first $(2n-i+1)^{th}$ mode taking the first B-bit $(i-1)^{th}$ intermediate result and a first B-bit initial value as inputs and producing a first B-bit $i^{th}$ intermediate encrypted result; and
    for i equal 2n,
        performing a first $2n^{th}$ cryptographic operation in the inverse first first state in the first first mode taking the first B-bit $(i-1)^{th}$ intermediate result and a first B-bit initial value as inputs and producing a first B-bit accelerator computed test result;
    updating the first B-bit initial value to create a second B-bit initial value;

for integer t equal 2 to T−1,
    for integer i equal 1,
        performing a $t^{th}$ first cryptographic operation in a $t^{th}$ first state in a $t^{th}$ first mode taking the $(t-1)^{th}$ B-bit accelerator computed test result and a $t^{th}$ B-bit initial value as inputs and producing a $t^{th}$ B-bit first intermediate encrypted result;
    for i from 2 to n,
        performing an $t^{th}i^{th}$ cryptographic operation in an $t^{th}i^{th}$ state in an $t^{th}i^{th}$ mode taking the $t^{th}$ B-bit $(i-1)^{th}$ intermediate result and a $t^{th}$ B-bit initial value as inputs and producing a $t^{th}$ B-bit $i^{th}$ intermediate encrypted result;
    for i from n+1 to 2n−1,
        performing an $t^{th}i^{th}$ cryptographic operation in the inverse $t^{th}(2n-i+1)^{th}$ state in the $t^{th}(2n-i+1)^{th}$ mode taking the $t^{th}$ B-bit $(i-1)^{th}$ intermediate result and a $t^{th}$ B-bit initial value as inputs and producing a $t^{th}$ B-bit $i^{th}$ intermediate encrypted result; and
    for i equal 2n,
        performing a $t^{th}2n^{th}$ cryptographic operation in the inverse $t^{th}$ first state in the $t^{th}$ first mode taking the $t^{th}$ B-bit$(i-1)^{th}$ intermediate result and a $t^{th}$ B-bit initial value as inputs and producing a $t^{th}$ B-bit accelerator computed test result;
    updating the $t^{th}$ B-bit initial value to create a $(t+1)^{th}$ B-bit initial value;

for integer t equal T,
    for integer i equal 1,
        performing a $T^{th}$ first cryptographic operation in a $T^{th}$ first state in a $T^{th}$ first mode taking the $(t-1)^{th}$ B-bit accelerator computed test result and a $T^{th}$ B-bit initial value as inputs and producing a $T^{th}$ B-bit first intermediate encrypted result;
    for i from 2 to n,
        performing an $T^{th}i^{th}$ cryptographic operation in an $T^{th}i^{th}$ state in an $T^{th}i^{th}$ mode taking the $T^{th}$ B-bit $(i-1)^{th}$ intermediate result and a $T^{th}$ B-bit initial value as inputs and producing a $T^{th}$ B-bit $i^{th}$ intermediate encrypted result;
    for i from n+1 to 2n−1,
        performing an $T^{th}i^{th}$ cryptographic operation in the inverse $T^{th}(2n-i+1)^{th}$ state in the $T^{th}(2n-i+1)^{th}$ mode taking the $T^{th}$ B-bit$(i-1)^{th}$ intermediate result and a $T^{th}$ B-bit initial value as inputs and producing a $T^{th}$ B-bit $i^{th}$ intermediate encrypted result; and
    for i equal 2n,
        performing a $T^{th}2n^{th}$ cryptographic operation in the inverse $T^{th}$ first state in the $T^{th}$ first mode taking the $T^{th}$ B-bit$(i-1)^{th}$ intermediate result and a $T^{th}$ B-bit initial value as inputs and producing a multi-cycle accelerator computed test result.

10. A method as in claim 9, further comprising the steps of:

comparing the B-bit multi-cycle accelerator computed test result to the B-bit cryptographic test block;
returning a pass result if the comparing step detects equality; and
returning a fail result if the comparing step does not detect equality.

11. A method as in claim 9, wherein B is 64.

12. A method as in claim 10,
wherein n is 4.

13. A method as in claim 12,
wherein for t from 1 to T,
wherein the $t^{th}$ first through $t^{th}$ fourth states are encryption.

14. A method as in claim 12,
wherein for t from 1 to T,
    wherein the $t^{th}$ first mode is Output Feedback Mode;
    wherein the $t^{th}$ second mode is Electronic Codebook Mode;
    wherein the $t^{th}$ third mode is Cipher Block Chaining Mode; and wherein the $t^{th}$ fourth mode is Output Feedback Mode.

15. A method as in claim 9, wherein each cryptographic operation is performed using a cryptographic implementation having a key input, a B-bit data input, a B-Bit initial value input, and an encrypt/decrypt state input, and producing a B-bit data output.

16. A method as in claim 9, further comprising the steps of:

for any t from 1 to T,
comparing the B-bit $t^{th}n^{th}$ intermediate encrypted result to a predetermined known correct answer;
returning a pass result if the comparing step detects equality; and
returning a fail result if the comparing step does not detect equality.

17. A method as in claim 15, wherein for t from 1 to T−1, the step of updating the $t^{th}$ B-bit initial value to create a $(t+1)^{th}$ B-bit initial value is performed in accordance with the $t^{th}$ first mode in the inverse $t^{th}$ first state.

18. A method as in claim 15, further comprising the step:
prior to the steps in which t is 1,
writing the B-bit cryptographic test block into a cryptographic B-bit data input register.

19. A method as in claim 18, further comprising the step of:

prior to the steps in which t is 1,
writing the first B-bit initial value into a B-bit initial value register.

20. A method as in claim 19, further comprising the step of:

prior to the steps in which t is 1,
writing the key into a key register.

21. A method as in claim 15, further comprising the step of:

prior to the step in which t is 1,
writing T to a test counter register.

22. A method as in claim 21, further comprising the steps of:

for t from 1 to T after the updating steps,
decrementing the test counter register.

* * * * *